(12) United States Patent
Misawa

(10) Patent No.: US 12,071,034 B2
(45) Date of Patent: Aug. 27, 2024

(54) VEHICLE

(71) Applicant: TOYOTA JIDOSHA KABUSHIKI KAISHA, Aichi-ken (JP)

(72) Inventor: Takahiro Misawa, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 223 days.

(21) Appl. No.: 17/858,994

(22) Filed: Jul. 7, 2022

(65) Prior Publication Data
US 2023/0027239 A1    Jan. 26, 2023

(30) Foreign Application Priority Data

Jul. 13, 2021 (JP) .................................. 2021-115574

(51) Int. Cl.
*B60L 53/302* (2019.01)
*B60L 53/30* (2019.01)
*B60L 58/26* (2019.01)
*B60L 58/27* (2019.01)

(52) U.S. Cl.
CPC .......... *B60L 53/302* (2019.02); *B60L 53/305* (2019.02); *B60L 58/26* (2019.02); *B60L 58/27* (2019.02)

(58) Field of Classification Search
CPC ...... B60L 53/302; B60L 58/27; B60L 53/305; B60L 58/26
See application file for complete search history.

(56) References Cited

U.S. PATENT DOCUMENTS

| | | | |
|---|---|---|---|
| 2009/0200987 A1* | 8/2009 | Saito | H01M 10/615 320/134 |
| 2012/0280050 A1* | 11/2012 | Tonozuka | B60L 3/0046 236/94 |
| 2021/0188127 A1* | 6/2021 | Klose | H02J 7/00309 |
| 2022/0289072 A1* | 9/2022 | Jeon | B60L 58/12 |

FOREIGN PATENT DOCUMENTS

| | | |
|---|---|---|
| JP | 201475297 A | 4/2014 |
| JP | 202025410 A | 2/2020 |

* cited by examiner

*Primary Examiner* — Ramsey Refai
(74) *Attorney, Agent, or Firm* — HAUPTMAN HAM, LLP

(57) ABSTRACT

A vehicle comprises a battery, a temperature adjustment unit, an inlet, a relay unit, a relay unit, a relay unit, and an ECU. When a power charging station is connected to the inlet, the ECU controls the relay unit to assume a closed position to perform external charging to charge the battery by the power charging station. When the ECU drives the temperature adjustment unit during the external charging and a component on a charging path at an electrical path located between a branch point and a branch point is higher in temperature than a threshold temperature, the ECU controls the relay unit to assume an open position and the relay unit to assume a closed position.

7 Claims, 7 Drawing Sheets

VEHICLE

This nonprovisional application is based on Japanese Patent Application No. 2021-115574 filed on Jul. 13, 2021 with the Japan Patent Office, the entire contents of which are hereby incorporated by reference.

BACKGROUND

Field

The present disclosure relates to a vehicle, and more particularly, to a vehicle comprising a power storage device.

Description of the Background Art

Japanese Patent Laying-Open No. 2014-075297 discloses a vehicle comprising a power storage device, an inlet, and a temperature adjustment device. The vehicle is configured to be capable of external charging for charging the power storage device by an external power source provided outside the vehicle. The inlet receives power from the external power source. The temperature adjustment device adjusts the power storage device in temperature. The temperature adjustment device operates using power supplied from the external power source to a charging path located between the inlet and the power storage device.

SUMMARY

When the temperature adjustment device as described above operates using the power supplied from the external power source to the charging path, and on the charging path, power to operate the temperature adjustment device is superimposed on power charged to the power storage device, a component on an electrical path constituting the charging path may overheat. Such a problem is not discussed in Japanese Patent Laying-Open No. 2014-075297.

The present disclosure has been made in order to solve the above problem, and an object of the present disclosure is to protect a component provided in an externally chargeable vehicle on an electrical path constituting a charging path, while adjusting a power storage device in temperature during external charging.

The presently disclosed vehicle comprises a power storage device, an inlet, first, second and third relay units, and a controller. The temperature adjustment device adjusts the power storage device in temperature. The inlet receives power from an external power source external to the vehicle. The first relay unit is provided on a charging path located between the inlet and the power storage device. The second relay unit is provided on a first branch path. The first branch path is branched from the charging path at a first branch point located between the inlet and the first relay unit, and electrically interconnects the first branch point and the temperature adjustment device. A third relay unit is provided on a second branch path. The second branch path is branched from the charging path at a second branch point located between the first relay unit and the power storage device, and electrically interconnects the second branch point and the temperature adjustment device. The controller controls the temperature adjustment device, and the first, second and third relay units. The controller performs external charging to charge the power storage device by the external power source by controlling the first relay unit to assume a closed position when the external power source is connected to the inlet. And the controller controls the third relay unit to assume an open position and the second relay unit to assume a closed position when during the external charging the controller drives the temperature adjustment device and a component on the charging path at an electrical path located between the first branch point and the second branch point is higher in temperature than a first threshold temperature.

With the above configuration, when the component on the electrical path is higher in temperature than the first threshold temperature, a portion of power supplied from the external power source while the external charging is performed is supplied via the first branch path to the temperature adjustment device as power to operate the temperature adjustment device. Thus, the power supplied to the electrical path is reduced by the amount of the power supplied to the temperature adjustment device via the first branch path. This can suppress overheating of the component on the electrical path while adjusting the power storage device in temperature.

The controller may control the second relay unit to assume an open position and the third relay unit to assume a closed position when the component on the electrical path is lower in temperature than the first threshold temperature and a component on the first branch path is higher in temperature than a second threshold temperature after the controller controls the third relay unit to assume the open position and the second relay unit to assume the closed position.

With the above configuration, while the external charging is performed, the first branch path no longer receives power, and power supplied to the first branch path is again supplied to the electrical path. And power equivalent in magnitude to that power is supplied via the electrical path and the third relay unit to the temperature adjustment device as power to operate the temperature adjustment device. This can suppress overheating of the component on the first branch path while adjusting the power storage device in temperature.

The controller may perform a process for reducing power supplied from the external power source to the inlet when the controller drives the temperature adjustment device during the external charging and the inlet is higher in temperature than a third threshold temperature.

With the above configuration, power supplied to the inlet while the external charging is performed is reduced. This can protect the inlet from overheating while adjusting the power storage device in temperature and protecting the component on the electrical path.

The controller may control the first relay unit and the second relay unit to assume the open position and the third relay unit to assume the closed position when the controller drives the temperature adjustment device and the inlet is higher in temperature than a third threshold temperature in a period after the external power source is connected to the inlet before the external charging starts.

With the above configuration, the power to operate the temperature adjustment device is supplied from the power storage device to the temperature adjustment device through the second branch path while power supplied from the external power source to the inlet is interrupted. This allows the power storage device to be adjusted in temperature while protecting the inlet from overheating before the external charging starts.

The vehicle may further comprise a fourth relay unit provided on the charging path between the second branch point and the power storage device. And when the controller receives an instruction to activate a traveling system of the vehicle, the controller may control the fourth relay unit to assume a closed position, and the controller may control the first relay unit and the second relay unit to assume the open position and the third relay unit to assume the closed position when the controller drives the temperature adjustment device while the controller controls the fourth relay unit to assume the closed position.

With the above configuration, the power to operate the temperature adjustment device is supplied from the power storage device to the temperature adjustment device through the second branch path while the traveling system of the vehicle is active and the power storage device is electrically disconnected from the inlet. As a result, even when the external power source is not connected to the inlet, such as when the vehicle is traveling, the temperature adjustment device can adjust the power storage device in temperature.

The temperature adjustment device may include a heating device that heats the power storage device. The controller may control the heating device such that the heating device generates heat in a larger amount in response to lower temperature of the power storage device.

With the above configuration, the power storage device can have effectively increased temperature. As a result, the power storage device can appropriately be protected in addition to the component on the electrical path.

The temperature adjustment device may include a cooling device that cools the power storage device. The controller may control the cooling device to be enhanced in performance of cooling the power storage device in response to higher temperature of the power storage device.

With the above structure, the power storage device can be cooled effectively. As a result, the power storage device can appropriately be protected in addition to the component on the electrical path.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

The present disclosure will now be described in embodiments hereinafter in detail with reference to the drawings. In the figures, identical or corresponding components are identically denoted and will not be described repeatedly.

Figure 1:
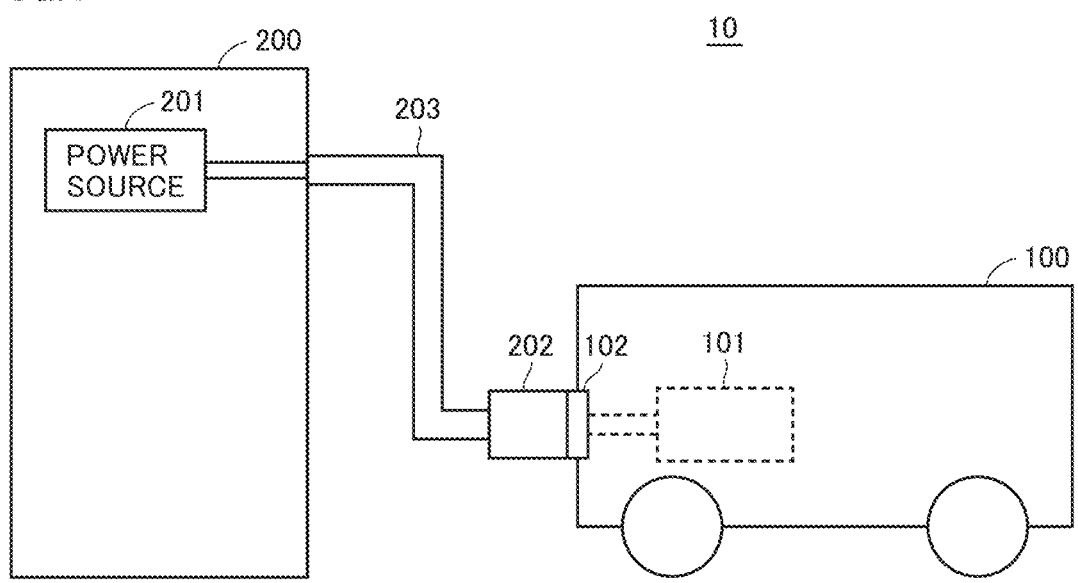
FIG. 1 is a diagram schematically showing a power supply system including a vehicle according to an embodiment.

FIG. 1 schematically shows a power supply system 10 comprising a vehicle according to an embodiment. Power supply system 10 comprises a vehicle 100 and a power charging station 200. Vehicle 100 is configured to be capable of external charging for charging a battery 101 (described later) by power charging station 200 provided outside vehicle 100.

In the present embodiment, vehicle 100 is a battery electric vehicle (BEV). Vehicle 100 is not limited to a BEV insofar as vehicle 100 is capable of external charging by power charging station 200. Vehicle 100 may be an electrically powered vehicle such as a hybrid electric vehicle (HEV) in which an internal combustion engine (not shown) is further mounted, or a fuel cell electric vehicle (FCEV). Vehicle 100 is configured to comply with the ChaoJi standard, one of standards for charging electrically powered vehicles.

Vehicle 100 includes battery 101 and an inlet 102. Battery 101 is a secondary battery such as a lithium ion battery or a nickel metal hydride battery. Battery 101 may be replaced by a power storage element such as an electric double layer capacitor. Battery 101 is a high-voltage battery (for example of about 200 V) for storing power for traveling.

Inlet 102 receives power supplied from power charging station 200. Inlet 102 is configured to connect to a connector 202 of power charging station 200.

As well as vehicle 100, power charging station 200 is configured to comply with the ChaoJi standard. Power charging station 200 includes a power source 201, a charging cable 203, and connector 202. Power source 201 supplies power to vehicle 100 through charging cable 203 and connector 202. Thus, power supplied from power charging station 200 is supplied to battery 101 through inlet 102 (i.e., vehicle 100 performs the external charging).

Figure 2:
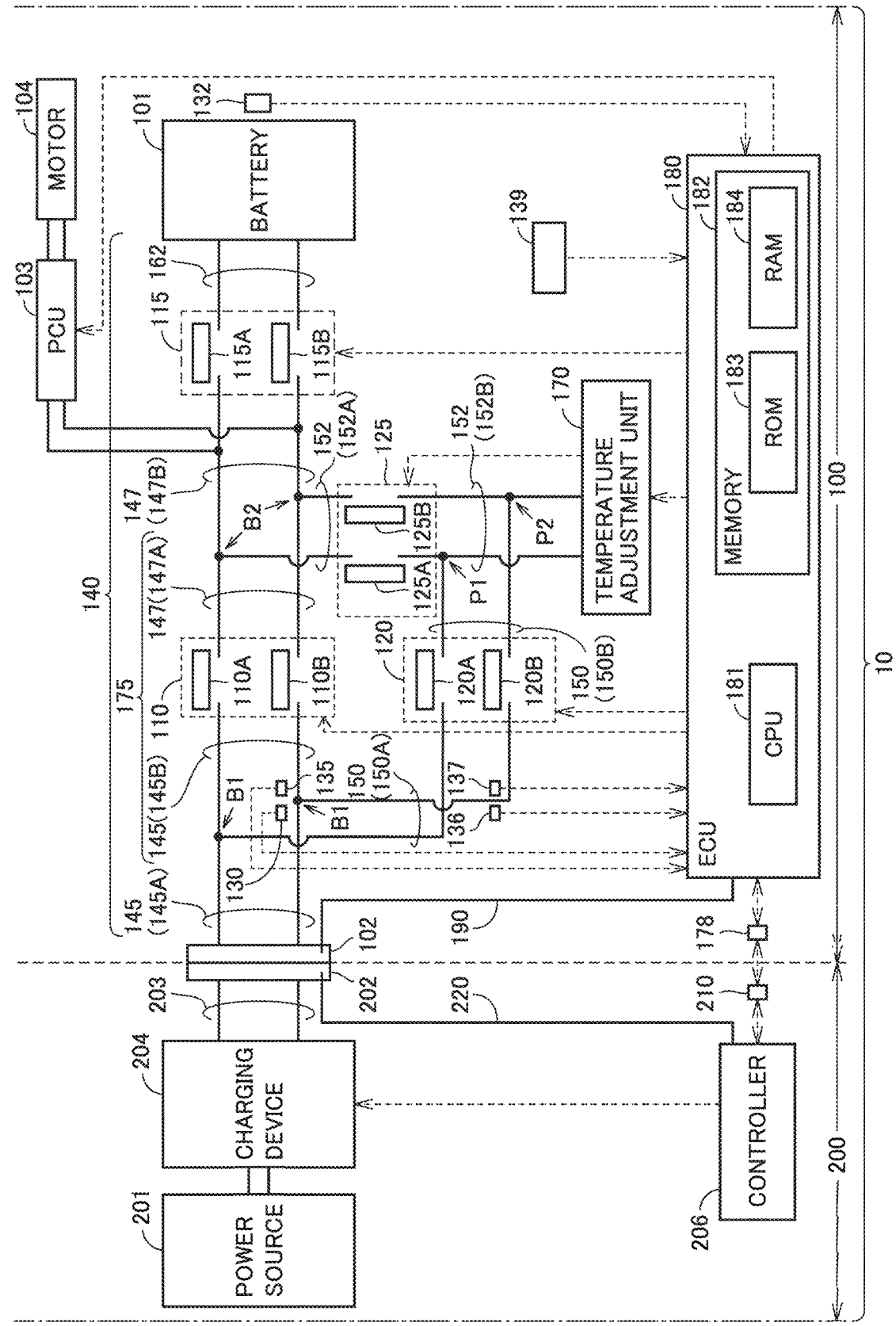
FIG. 2 is a diagram showing a detailed configuration of the vehicle and a power charging station.

FIG. 2 is a diagram showing a detailed configuration of vehicle 100 and power charging station 200. Referring to FIG. 2, vehicle 100 includes, in addition to battery 101 and inlet 102, a temperature adjustment unit 170 and relay units 110, 115, 120, 125. Vehicle 100 further includes a PCU (Power Control Unit) 103, a motor 104, temperature sensors 130, 132, and 136, and current sensors 135 and 137. Vehicle 100 further includes a communication device 178, an ECU (Electrical Control Unit) 180, and a start switch 139.

A connection detection line 190 extends from inlet 102 to ECU 180. Connection detection line 190 is provided for ECU 180 to detect whether connector 202 is connected to inlet 102.

Temperature adjustment unit 170 includes a heater and a cooler (none of which is shown). Temperature adjustment unit 170 adjusts the temperature of battery 101 by heating or cooling battery 101. Temperature adjustment unit 170 operates as it receives power from power charging station 200 or battery 101.

Figure 3:
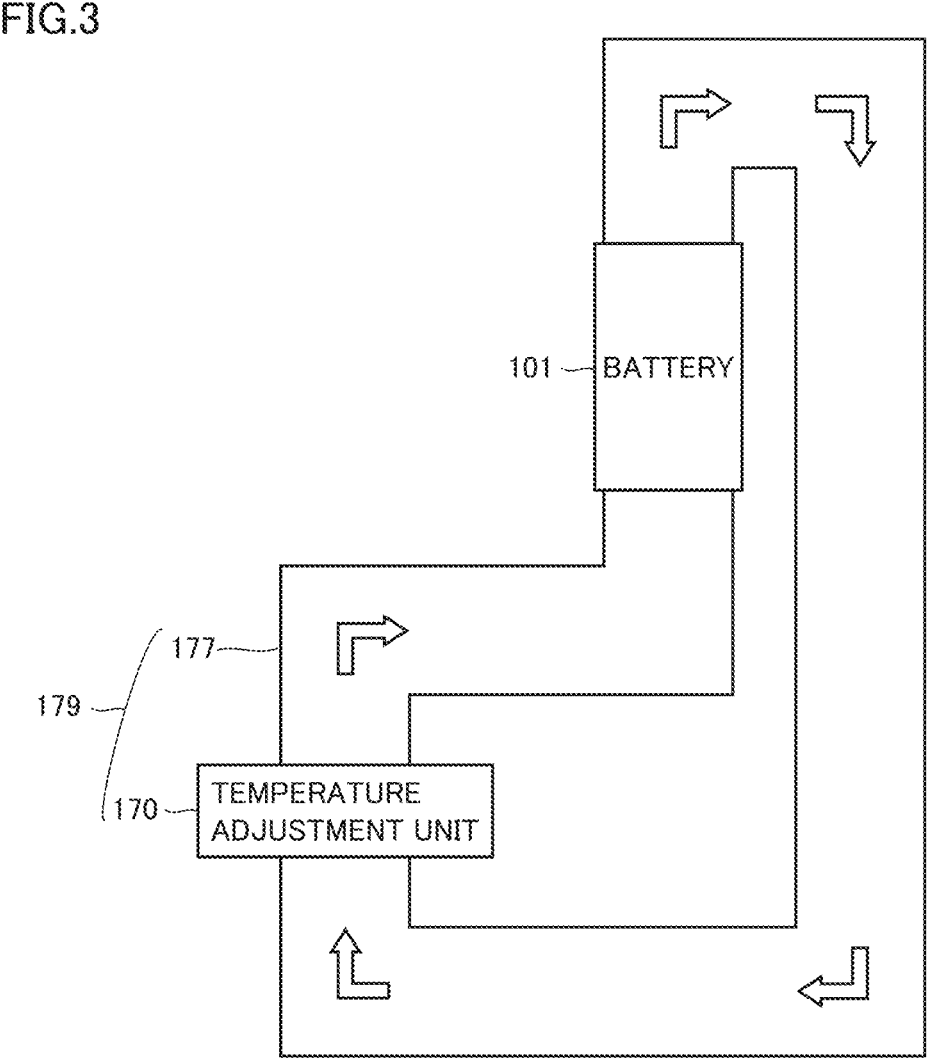
FIG. 3 is a diagram showing a battery temperature adjustment mechanism by a temperature adjustment unit.

FIG. 3 is a diagram showing a temperature adjustment mechanism 179 for battery 101 by temperature adjustment unit 170. Referring to FIG. 3, temperature adjustment mechanism 179 includes a water passage 177 in addition to temperature adjustment unit 170. Water passage 177 is provided so that temperature adjustment unit 170 indirectly heats or cools battery 101 via the water in water passage 177. The water in water passage 177 is circulated by an electric water pump (not shown) provided at water passage 177 and thus flows in a direction indicated in the figure by a blank arrow. Thus, battery 101 is indirectly heated or cooled by the water in water passage 177. This suppresses unevenness in temperature of battery 101 and thus adjusts the temperature of battery 101 throughout uniformly.

Typically, when battery 101 is lower in temperature, battery 101 less easily lets a current pass therethrough. As a result, battery 101 is charged more slowly. Therefore, from the viewpoint of shortening the time required for external charging, the external charging is preferably started after battery 101 is adjusted in temperature to fall within a predetermined threshold range (described later). Similarly, excessively high temperature of battery 101 is undesirable from the viewpoint of protection of battery 101. Accordingly, a temperature adjustment device such as temperature adjustment unit 170 that adjusts the temperature of battery 101 is mounted in vehicle 100.

Referring again to FIG. 2, relay unit 110 includes relays 110A and 110B. Relay unit 110 is provided on a charging path 140 located between inlet 102 and battery 101. Charging path 140 includes, for example, power line pairs 145, 147, and 162 as wire harnesses. Relay unit 110 has one end and the other end connected to power line pairs 145 and 147 via connectors (not shown), respectively.

Relay unit 115 includes relays 115A and 115B. As well as relay unit 110, relay unit 115 is provided on charging path 140. Relay unit 115 is provided on charging path 140 between a branching point B2 (described later) and battery 101. Relay unit 115 has one end and the other end connected to power line pairs 147 and 162 via connectors (not shown), respectively.

A branch path 150 is branched from charging path 140 at a branching point B1 of power line pair 145 located between inlet 102 and relay unit 110. Branch path 150 is configured to electrically interconnect branching point B1 and temperature adjustment unit 170.

Relay unit 120 includes relays 120A and 120B. Relay unit 120 is provided on branch path 150. Relay unit 120 has one end and the other end connected to power line pairs 150A and 150B of branch path 150 via connectors (not shown), respectively. Power line pairs 150A and 150B are wire harnesses.

Branch path 152 is branched from charging path 140 at branching point B2 of power line pair 147 located between relay unit 110 and relay unit 115. Branch path 152 is configured to electrically interconnect branching point B2 and temperature adjustment unit 170.

Relay unit 125 includes relays 125A and 125B. Relay unit 125 is provided on branch path 152. Relay unit 125 has one end and the other end connected to power line pairs 152A and 152B of branch path 152 via connectors (not shown), respectively. Branch path 150 and branch path 152 are connected at connection points P1 and P2. Power line pairs 152A and 152B are wire harnesses.

PCU 103 receives DC power supplied from battery 101 and converts the received DC power into AC power. PCU 103 includes, for example, an inverter and a converter.

Motor 104 is, for example, a permanent magnet type synchronous motor including a rotor having a permanent magnet embedded therein. Motor 104 rotates as it receives power supplied from battery 101 through PCU 103. This generates driving force to cause vehicle 100 to travel. As a result, vehicle 100 travels.

Temperature sensor 130 senses the temperature of a component on charging path 140 at an electrical path 175 located between branching points B1 and B2 (a component of electrical path 175). The component on electrical path 175 is, for example, relays 110A and 110B, power line pairs 145B and 147A, or connectors that connect one and the other ends of relay unit 110 to power line pairs 145B and 147A, respectively. Temperature sensor 130 may sense the temperature of any of these components. Temperature sensor 130 outputs a sensed value to ECU 180.

Current sensor 135 senses a current passing through the component on electrical path 175. Current sensor 135 outputs a sensed value to ECU 180.

Temperature sensor 136 senses the temperature of a component on branch path 150. The component on branch path 150 is, for example, relays 120A and 120B, power line pairs 150A and 150B, or connectors that connect one and the other ends of relay unit 120 to power line pairs 150A and 150B, respectively. Temperature sensor 136 may sense the temperature of any of these components. Temperature sensor 130 outputs a sensed value to ECU 180.

Current sensor 137 senses a current passing through the component on branch path 150. Current sensor 137 outputs a sensed value to ECU 180.

Temperature sensor 132 senses the temperature of battery 101 and outputs a sensed value to ECU 180.

Communication device 178 performs wireless communications with a communication device 210 (described later) of power charging station 200. Specifically, communication device 178 receives information from ECU 180 and transmits the received information to communication device 210, and receives information from communication device 210 and transmits the received information to ECU 180.

ECU 180 includes a CPU (Central Processing Unit) 181 and a memory 182. CPU 181 executes various calculations in accordance with information stored in memory 182 and information received from each sensor. Memory 182 includes a ROM (Read Only Memory) 183 and a RAM (Random Access Memory) 184. ROM 183 stores a program executed by CPU 181. RAM 184 temporarily stores data referenced by CPU 181. While control of ECU 180 is implemented through software processing, it may be implemented by hardware.

ECU 180 controls temperature adjustment unit 170, relay units 110, 115, 120 and 125, PCU 103, and communication device 178. ECU 180 controls relay units 110, 115, 120, 125 in accordance with sensed values of temperature sensors 130 and 136, controls temperature adjustment unit 170 in accordance with a sensed value of temperature sensor 132, and communicates with a controller 206 (described later) of power charging station 200 through communication device 178, for example.

When power charging station 200 has connector 202 electrically connected to inlet 102, ECU 180 controls relay units 110 and 115 to assume a closed position to perform external charging to charge battery 101 by power charging station 200.

ECU 180 determines in accordance with a sensed value of temperature sensor 132 whether ECU 180 outputs a request to power charging station 200 for a thermal management mode (described later) in order to control the temperature of battery 101.

Start switch 139 receives a user's operations to activate or inactivate a traveling system of vehicle 100. Specifically, when the user performs an operation to turn on start switch 139, an instruction to activate the traveling system is output from start switch 139 to ECU 180. Upon receipt of the instruction to activate the traveling system, ECU 180 switches the traveling system of vehicle 100 from an inactive state to an active state, and controls relay unit 115 to assume the closed position. Thus, vehicle 100 is switched to a Ready-ON state (a state ready to travel).

In contrast, when the user performs an operation to turn off start switch 139, an instruction to inactivate the traveling system is output from start switch 139 to ECU 180. Upon receipt of the instruction to inactivate the traveling system, ECU 180 switches the traveling system of vehicle 100 from the active state to the inactive state, and controls relay unit 115 to assume an open position. Thus, vehicle 100 is switched between the Ready-ON state and a Ready-OFF state in response to an operation of start switch 139.

In addition to power source 201, connector 202 and charging cable 203, power charging station 200 includes a charging device 204, communication device 210, and controller 206.

A connection detection line 220 extends from connector 202 to controller 206. A pull-up power supply (not shown) is connected to connection detection line 220. As will be described below, connection detection line 220 is provided so that ECU 180 can detect whether connector 202 is connected to inlet 102.

When connector 202 is connected (inserted) to inlet 102, connection detection lines 190 and 220 are electrically connected together. As a result, the pull-up power supply of connection detection line 220 is electrically connected to connection detection line 190, and accordingly, connection detection line 190 varies in voltage. ECU 180 can detect whether connector 202 is connected to inlet 102 in accordance with whether connection detection line 190 varies in voltage (for example, whether the voltage value has changed from the low level to the high level or vice versa). Once connector 202 has been connected to inlet 102, ECU 180 automatically inactivates the traveling system of vehicle 100.

Charging device 204 receives AC power or DC power supplied from power source 201 and converts the received power into DC power of a voltage level for battery 101 of vehicle 100. The converted DC power (or supplied power) is supplied to inlet 102 of vehicle 100 via charging cable 203 and connector 202. Charging device 204 is a circuit including a switching element such as a metal-oxide-semiconductor field-effect transistor (MOSFET), an insulated-gate bipolar transistor (IGBT), or a bipolar transistor, and can adjust the supplied power in magnitude by switching on/off the switching element.

Communication device 210 transmits and receives information and signals to and from communication device 178 of vehicle 100. Communication device 210 receives a request signal sent by ECU 180 of vehicle 100 via communication device 178. The request signal is, for example, a request to start charging, a request to reduce supplied power, a request to stop charging, or a request for the thermal management mode.

Controller 206 controls charging device 204 and communication device 210 based on, for example, a request signal received from ECU 180. Upon receipt of a request from ECU 180 via communication device 178 and communication device 210 to reduce power supplied, controller 206 controls charging device 204 to reduce power output (or supplied) from charging device 204. Upon receipt of a request from ECU 180 to start (stop) charging, controller 206 starts (stops) charging device 204 to start (stop) supplying power to inlet 102.

Controller 206 receives a request from ECU 180 for the thermal management mode. The thermal management mode is one of the operation modes of power charging station 200 when connector 202 is connected to inlet 102. More specifically, the thermal management mode is an operation mode of power charging station 200 for temperature management for equipment such as charging cable 203, connector 202, inlet 102 and battery 101 of power supply system 10.

As an example of the thermal management mode, a thermal management mode for battery 101 will be described. When battery 101 has a temperature outside a threshold range (described later) before the external charging starts, ECU 180 outputs a request for the thermal management mode for battery 101 to controller 206 of power charging station 200 in order to set the temperature within the threshold range. Hereinafter, the thermal management mode for battery 101 will also be referred to as a "battery temperature adjustment mode."

In the battery temperature adjustment mode, power charging station 200 supplies power to temperature adjustment unit 170 through inlet 102 while battery 101 is electrically disconnected from power charging station 200 (that is, battery 101 is not charged). Controller 206 of power charging station 200 controls charging device 204 so that the power supplied from power charging station 200 to inlet 102 is equivalent to the power to operate temperature adjustment unit 170. Typically, the power to operate temperature adjustment unit 170 is smaller than the power charged to battery 101 during the external charging. Therefore, the power supplied during the battery temperature adjustment mode (i.e., the power to operate temperature adjustment unit 170) is smaller than the power supplied during the external charging. Details of control by ECU 180 relating to the battery temperature adjustment mode of power charging station 200 will be described later.

When temperature adjustment unit 170 operates using power supplied to charging path 140 from power charging station 200 through inlet 102 and the power to operate temperature adjustment unit 170 is superimposed on the power charged to battery 101 on electrical path 175, a component on electrical path 175 may overheat. When the component on electrical path 175 overheats, the component cannot be protected.

Vehicle 100 according to the present embodiment is configured to address the above problem. Specifically, when power charging station 200 is electrically connected to inlet 102, ECU 180 controls relay units 110 and 115 to assume the closed position to perform the external charging to charge battery 101 by power charging station 200. During the external charging, ECU 180 drives temperature adjustment unit 170 and when the component on electrical path 175 is higher in temperature than a threshold temperature (described later), ECU 180 controls relay unit 125 to assume the open position and relay unit 120 to assume the closed position.

With the above configuration, when the component on electrical path 175 is higher in temperature than the threshold temperature, a portion of the power supplied from power charging station 200 while external charging is performed is supplied via branch path 150 to temperature adjustment unit 170 as the power to operate temperature adjustment unit 170. Thus, the power supplied to electrical path 175 is reduced by the amount of the power supplied to temperature adjustment unit 170 via branch path 150. Therefore, the power to operate temperature adjustment unit 170 is no longer superimposed on the power charged to battery 101 on electrical path 175. This can suppress overheating of the component on electrical path 175. Thus the component on electrical path 175 can be protected while battery 101 is adjusted in temperature (i.e., while temperature adjustment unit 170 is driven) during the external charging. Hereinafter, how ECU 180 provides control will more specifically be described.

Figure 4:
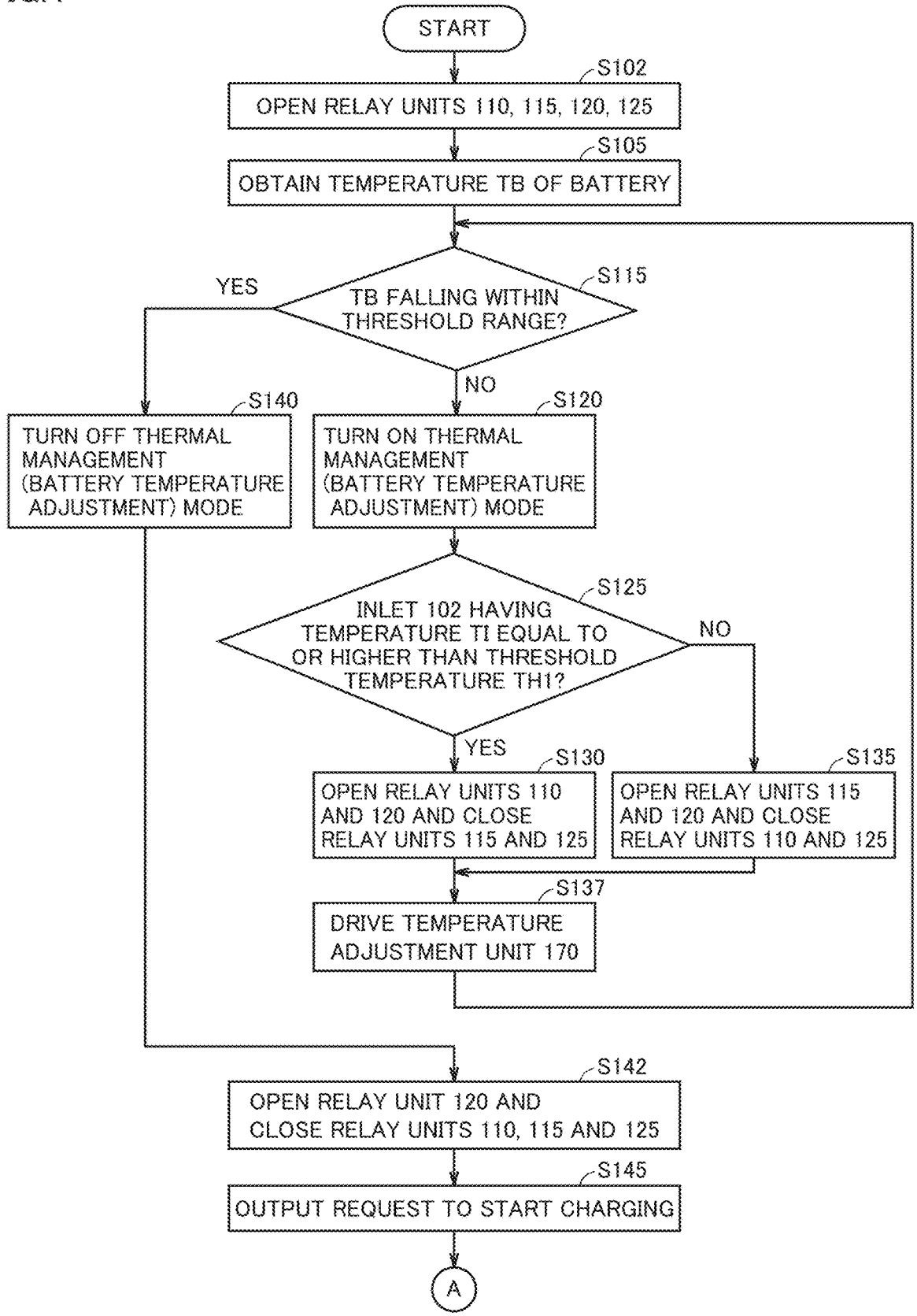
FIG. 4 is a diagram showing an example of a procedure of a process performed by an ECU in association with external charging.
Figure 5:
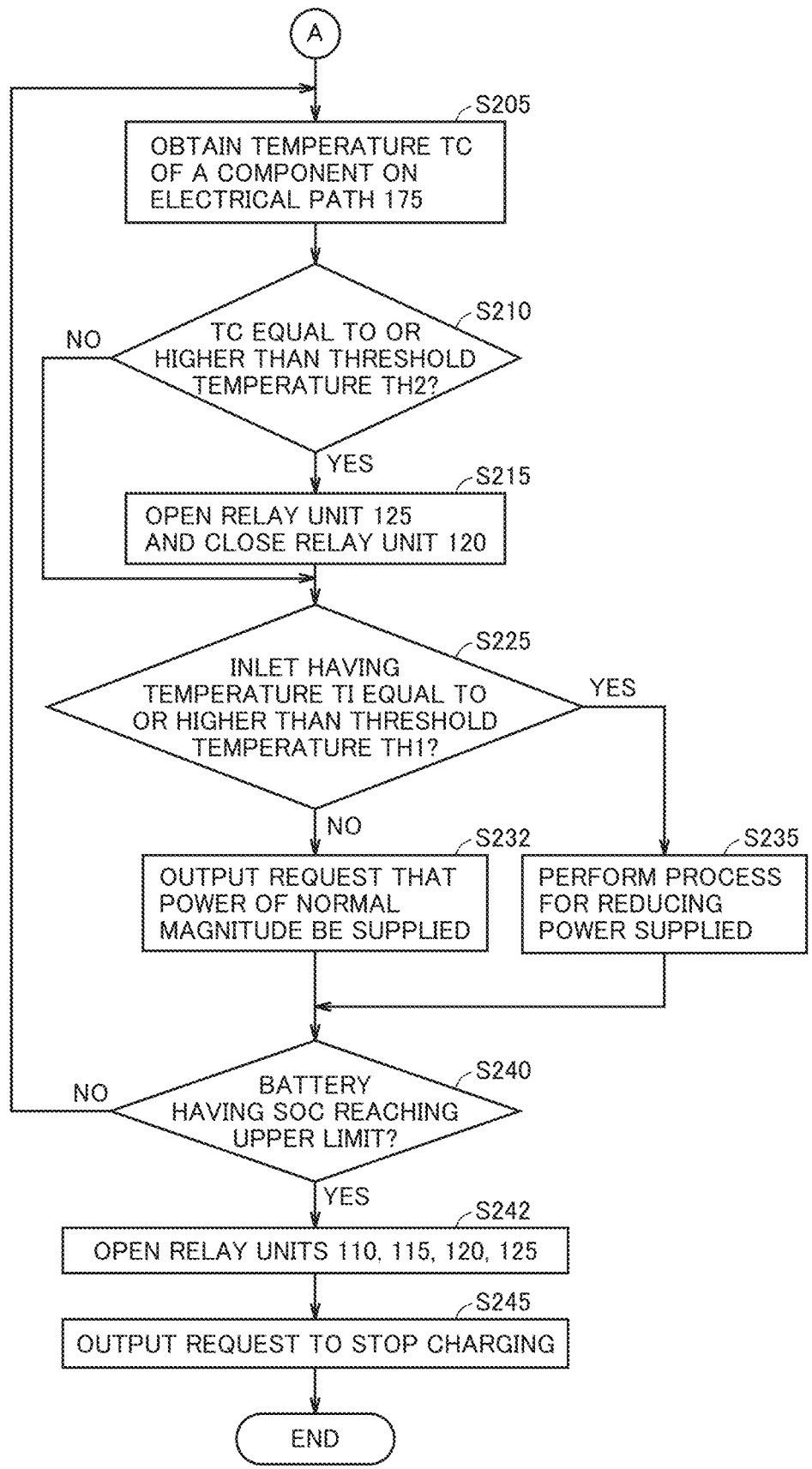
FIG. 5 is a diagram showing an example of a procedure of a process performed by the ECU in association with the external charging.

FIGS. 4 and 5 are diagrams showing an example of a procedure of a process performed by ECU 180 in association with the external charging. Specifically, the processes shown in FIGS. 4 and 5 correspond to a process performed by ECU 180 before the external charging starts and that performed thereby during the external charging, respectively. The series of steps in the flowcharts of FIGS. 4 and 5 starts when connector 202 of power charging station 200 is connected to inlet 102 of vehicle 100.

Referring to FIG. 4, ECU 180 controls relay units 110, 115, 120, 125 to assume the open position (step S102), and obtains temperature TB of battery 101 in accordance with a sensed value of temperature sensor 132 (step S105).

Subsequently, in step S115, ECU 180 determines whether temperature TB falls within a predetermined threshold range. The threshold range is appropriately predetermined in order to prevent battery 101 from being charged at an excessively low rate, protect battery 101 from overheating, and the like. When temperature TB falls within the threshold range (YES in step S115), ECU 180 outputs a request to controller 206 of power charging station 200 to turn off the thermal management mode (or the battery temperature adjustment mode) (step S140), and proceeds to step S142.

In contrast, when temperature TB does not fall within the threshold range (NO in step S115), ECU 180 outputs a request to controller 206 of power charging station 200 to turn on the thermal management mode (or the battery temperature adjustment mode) (step S120). In response to the request, controller 206 controls charging device 204 to supply power for the battery temperature adjustment mode. The power for the battery temperature adjustment mode is equivalent to the power to operate temperature adjustment unit 170 and smaller than the charging power during the external charging. Thereafter, ECU 180 proceeds to step S125.

In step S125, ECU 180 determines whether inlet 102 has a temperature TI equal to or higher than a threshold temperature TH1. Threshold temperature TH1 is predetermined as appropriate in order to protect inlet 102 from overheating. When temperature TI is less than threshold temperature TH1 (NO in step S125), ECU 180 controls relay units 115 and 120 to assume the open position and relay units 110 and 125 to assume the closed position (step S135). Thus, the power to operate temperature adjustment unit 170 is supplied from power charging station 200 to temperature adjustment unit 170 via inlet 102 and relay units 110 and 125. As a result, the temperature of battery 101 can be adjusted before the external charging starts without consumption of power of battery 101.

In contrast, when temperature TI is equal to or higher than threshold temperature TH1 (YES in step S125), ECU 180 controls relay units 110 and 120 to assume the open position and relay units 115 and 125 to assume the closed position (step S130). Thus, while power supplied from power charging station 200 to inlet 102 is interrupted, the power to operate temperature adjustment unit 170 is supplied from battery 101 to temperature adjustment unit 170 through branch path 152. Therefore, before the external charging starts, the temperature of battery 101 can be adjusted while inlet 102 is protected from overheating. This can prevent battery 101 from being charged at a reduced rate during the external charging.

After step S130 or S135, ECU 180 drives temperature adjustment unit 170 (step S137), and returns the process to step S115. Thus, during the battery temperature adjustment mode of power charging station 200, until temperature TB falls within the threshold range (i.e., until the process is branched in step S115 to YES), relay units 110, 115, and 125 are controlled and temperature adjustment unit 170 is driven (that is, steps S115 to S137 are repeated). Thereafter, when temperature TB falls within the threshold range (YES in step S115), then, in response to a request to exit the battery temperature adjustment mode of power charging station 200 (step S140), the battery temperature adjustment mode of power charging station 200 is exited.

Subsequently, ECU 180 controls relay unit 120 to assume the open position and relay units 110, 115, and 125 to assume the closed position (step S142), and outputs a request to controller 206 to start charging (step S145).

Thus, power supplied from power charging station 200 to inlet 102 is supplied to battery 101 through charging path 140, and the external charging starts. As relay unit 125 is controlled to assume the closed position, a portion of the supplied power is supplied through inlet 102 and relay units 110 and 125 to temperature adjustment unit 170 as the power to operate temperature adjustment unit 170. As a result, temperature adjustment unit 170 receives the power and enters an operable state. That is, ECU 180 can adjust temperature TB of battery 101 by driving temperature adjustment unit 170 even during the external charging by controlling relay unit 125 to assume the closed position.

During the external charging, regardless of whether temperature adjustment unit 170 is operated (driven), the power supplied is substantially constant in magnitude unless ECU 180 outputs a request to reduce the power supplied. After step S145, ECU 180 proceeds to step S205 in FIG. 5.

Referring to FIG. 5, ECU 180 obtains a temperature TC of the component on charging path 140 at electrical path 175 in accordance with a sensed value of temperature sensor 130 (step S205).

In step S210, ECU 180 determines whether temperature TC is equal to or higher than a threshold temperature TH2 (step S210). Threshold temperature TH2 is predetermined as appropriate to protect the component on electrical path 175 from overheating. When temperature TC is less than threshold temperature TH2 (NO in step S210), ECU 180 proceeds to step S225.

In contrast, when temperature TC is equal to or higher than threshold temperature TH2 (YES in step S210), ECU 180 controls relay unit 125 to assume the open position and relay unit 120 to assume the closed position (step S215). Thus, during the external charging, a portion of power supplied from power charging station 200 is supplied via branch path 150 to temperature adjustment unit 170 as the power to operate temperature adjustment unit 170. Therefore, the power supplied to electrical path 175 is reduced by the amount of the power supplied to temperature adjustment unit 170 via branch path 150. As a result, overheating of the component on electrical path 175 can be suppressed during the external charging while the temperature of battery 101 is adjusted (or temperature adjustment unit 170 is driven).

In step S225, ECU 180 determines whether temperature TI of inlet 102 is equal to or higher than threshold temperature TH1. When temperature TI is equal to or higher than threshold temperature TH1 (YES in step S225), ECU 180 proceeds to step S235. In contrast, when temperature TI is less than threshold temperature TH1 (NO in step S225), ECU 180 outputs a request that power of a normal magnitude be supplied (step S232), and proceeds to step S240. The "power of a normal magnitude supplied" is power of a magnitude supplied when a "process for reducing power supplied" described later is not performed.

In step S235, ECU 180 performs a process for reducing power supplied from power charging station 200 to inlet 102. The "process for reducing power supplied," which includes a request for reducing to 0 the power supplied, is a process for outputting a request to controller 206 of power charging station 200 that power lower than the "power of the normal magnitude supplied" in step S232 be supplied. In response to the request, controller 206 of power charging station 200 controls charging device 204 to reduce the power supplied. The "process for reducing power supplied" may be a process (control) for opening relay units 110 and 115. Thus, power supplied from power charging station 200 to inlet 102 is stopped and thus reduced to 0.

As described above, by performing the "process for reducing power supplied," power supplied to inlet 102 is reduced, and inlet 102 can be protected from overheating. After step S235, ECU 180 proceeds to step S240.

In step S240, ECU 180 determines whether battery 101 has an SOC (State of Charge) reaching an upper limit. ECU 180 calculates the SOC of battery 101 using a known method based on the current, voltage, temperature, and the like of battery 101. The upper limit is appropriately preset, for example, for determination of whether battery 101 is fully charged. Alternative to this step, ECU 180 may determine whether the OCV (Open Circuit Voltage) of the battery has reached an upper limit.

When the SOC of battery 101 has not reached the upper limit (NO in step S240), ECU 180 returns the process to step S205. Thus, steps S205 to S240 are repeated until the SOC reaches the upper limit (that is, until the process branches to YES in step S240). When the "process for reducing power supplied" is performed in step S235 and thereafter in step S240 the process branches to NO and step S232 is performed, the power supplied recovers from the power supplied after the reduction (step S235) to the "power of the normal magnitude supplied" (step S232).

In contrast, when the SOC of battery 101 reaches the upper limit (YES in step S240), ECU 180 controls relay units 110, 115, 120, 125 to assume the open position (step S242), and outputs a request to controller 206 of power charging station 200 to stop charging (step S245). Thus, the external charging ends, and a series of steps ends.

While in the process of the flowchart of FIG. 5 steps S225, S232, and 235 are performed after steps S210 and S215, steps S225, S232, and 235 may be performed before steps S210 and S215.

In the present embodiment, thermal management (or temperature adjustment) of battery 101 by temperature adjustment unit 170 is also performed while the traveling system is active (for example, while vehicle 100 travels).

More specifically, relay unit 110 is controlled to assume the open position while the traveling system of vehicle 100 is active (i.e., while relay unit 115 is controlled to assume the closed position). When temperature TB of battery 101 does not fall within the threshold range, ECU 180 controls relay unit 125 to assume the closed position and relay unit 120 to assume the open position. Thus, the power to operate temperature adjustment unit 170 is supplied from battery 101 to temperature adjustment unit 170 through branch path 152. Thus, temperature adjustment unit 170 enters the operable state. In addition, battery voltage can be prevented from being output to inlet 102. ECU 180 drives temperature adjustment unit 170 so that temperature TB of battery 101 falls within the threshold range. As a result, even when power charging station 200 is not connected to inlet 102 such as when vehicle 100 is traveling, ECU 180 can adjust the temperature of battery 101 by driving temperature adjustment unit 170.

Figure 6:
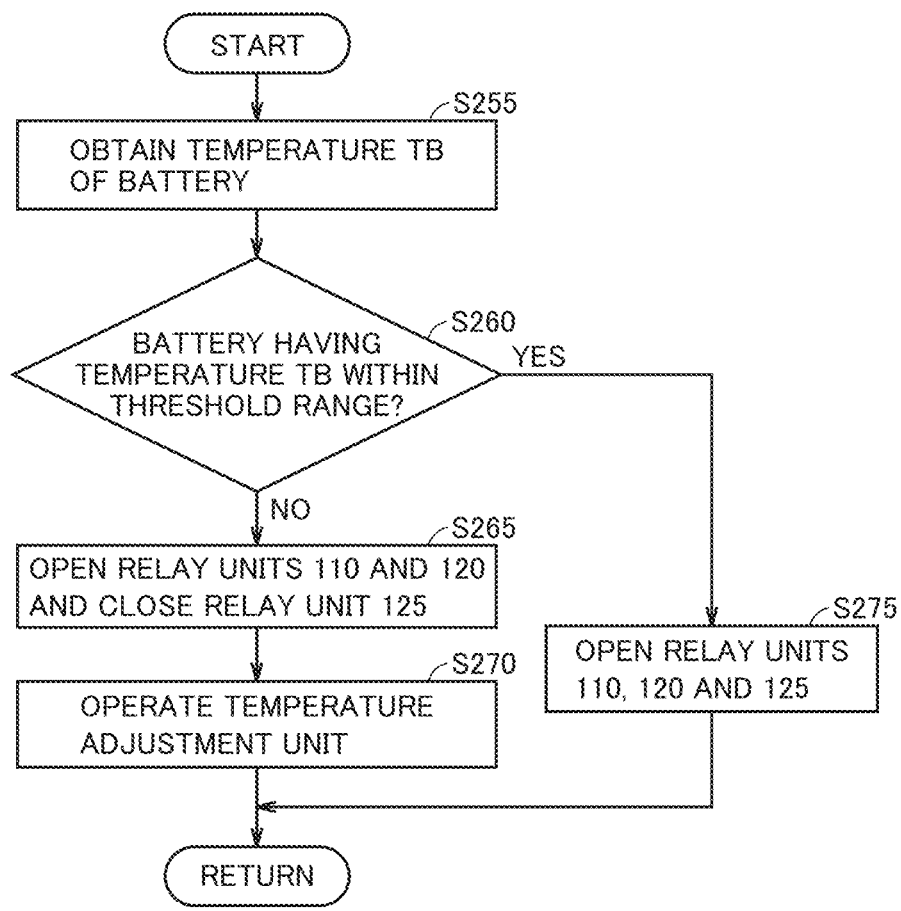
FIG. 6 is a flowchart showing an example of a procedure of a process relevant to adjusting the temperature of a battery while a vehicular travelling system is active.

FIG. 6 is a flowchart showing an example of a procedure of a process related to temperature adjustment of battery 101 while the traveling system of vehicle 100 is active. This flowchart is performed whenever a predetermined period of time elapses while the traveling system of vehicle 100 is active.

Referring to FIG. 6, ECU 180 obtains temperature TB of battery 101 in accordance with a sensed value of temperature sensor 132 (step S255).

Subsequently, ECU 180 determines whether temperature TB of battery 101 falls within the threshold range (step S260). When temperature TB falls within the threshold range (YES in step S260), ECU 180 controls relay units 110, 120, and 125 to assume the open position (step S275). This can prevent battery 101 from supplying power to inlet 102 and temperature adjustment unit 170. After step S260, the process proceeds to a return.

In contrast, when temperature TB does not fall within the threshold range (NO in step S260), ECU 180 controls relay units 110 and 120 to assume the open position and relay unit 125 to assume the closed position (step S265). Thus, while the traveling system of vehicle 100 is active, battery 101 and inlet 102 are electrically disconnected, and the power to operate temperature adjustment unit 170 is supplied from battery 101 to temperature adjustment unit 170 through branch path 152. Therefore, while the traveling system of vehicle 100 is active, temperature adjustment unit 170 enters the operable state. Temperature adjustment unit 170 operates (or driven) as it receives the power supplied from battery 101 (step S270). Thereafter, the process proceeds to the return.

Thus, even while the traveling system of vehicle 100 is active, ECU 180 can drive temperature adjustment unit 170 by controlling relay units 110, 115, 120, 125. As a result, the temperature of battery 101 can be appropriately adjusted.

As described above, according to the present embodiment, when ECU 180 drives temperature adjustment unit 170 during the external charging and the component on electrical path 175 is higher in temperature than threshold temperature TH2 (YES in step S210 in FIG. 5), ECU 180 controls relay unit 125 to assume the open position and relay unit 120 to assume the closed position (step S215).

When the component on electrical path 175 is higher in temperature than threshold temperature TH2, a portion of power supplied from power charging station 200 during external charging is supplied via branch path 150 to temperature adjustment unit 170 as the power to operate temperature adjustment unit 170. Thus, the power supplied to electrical path 175 is reduced by the amount of the power supplied to temperature adjustment unit 170 via branch path 150. Therefore, the power to operate temperature adjustment unit 170 is no longer superimposed on the power charged to battery 101 in electrical path 175. As a result, overheating of the component on electrical path 175 can be suppressed while the temperature of battery 101 is adjusted.

Such an advantage is particularly significant for a vehicle which has battery 101 with a relatively small capacity and receives smaller power during the external charging. Let us consider a case in which a first vehicle (for example, a small EV) is supplied with power PW1 during the external charging and a second vehicle (for example, a large EV) is supplied with power PW2 during the external charging (PW1<PW2). In this case, it is assumed that, of the supplied power, the power supplied to branch path 150 is PW3 for any of these vehicles (i.e., PW3<PW1, PW2).

When step S215 of FIG. 5 is performed, the power supplied to electrical path 175 of the first vehicle is reduced by the amount of the power of (PW3/PW1)×100 (=A1) [%] of the power supplied from an external power source. In contrast, the power supplied to electrical path 175 of the second vehicle is reduced by the amount of the power of (PW3/PW2)×100 (=A2) [%] of the power supplied from an external power source. Herein, since PW1<PW2 holds, A1>A2 [%] holds. In other words, a power reduction rate for the component on electrical path 175 of the first vehicle is greater than that for the second vehicle.

As described above, a vehicle which is supplied with smaller power during the external charging can more remarkably exploit the advantage of the present embodiment. That is, the component on electrical path 175 can be protected more effectively.

In the present embodiment, the power supplied before step S215 to temperature adjustment unit 170 through branch path 152 to operate temperature adjustment unit 170 is substantially the same as the power supplied after step S215 to temperature adjustment unit 170 through branch path 150 to operate temperature adjustment unit 170. Therefore, the power supplied to battery 101 through power line pair 162 during the external charging corresponds to the power obtained by subtracting the power supplied to temperature adjustment unit 170 through branch path 150 or 152 from the power supplied from an external power source both before and after step S215. That is, the power supplied to battery 101 during the external charging does not change before and after step S215. Therefore, according to the present embodiment, the component on electrical path 175 can be protected while a rate of charging during the external charging is not decreased.

Modified Example 1

In the above-described embodiment, when ECU 180 drives temperature adjustment unit 170 during the external charging and temperature TC of the component on electrical path 175 is higher than threshold temperature TH2, ECU 180 controls relay unit 125 to assume the open position and relay unit 120 to assume the closed position (step S215 in FIG. 5). Then, ECU 180 branches the process according to whether temperature TI of inlet 102 is higher than threshold temperature TH1 (step S225).

In this modified example, a processing corresponding to step S215 is performed and thereafter when temperature TC of the component on electrical path 175 is lower than threshold temperature TH2 and the temperature of the component on branch path 150 is higher than a threshold temperature (described later), ECU 180 controls relay unit 120 to assume the open position and relay unit 125 to assume the closed position. This can suppress overheating of the component on branch path 150 while adjusting the temperature of battery 101. Hereinafter, this point will be described in detail.

Figure 7:
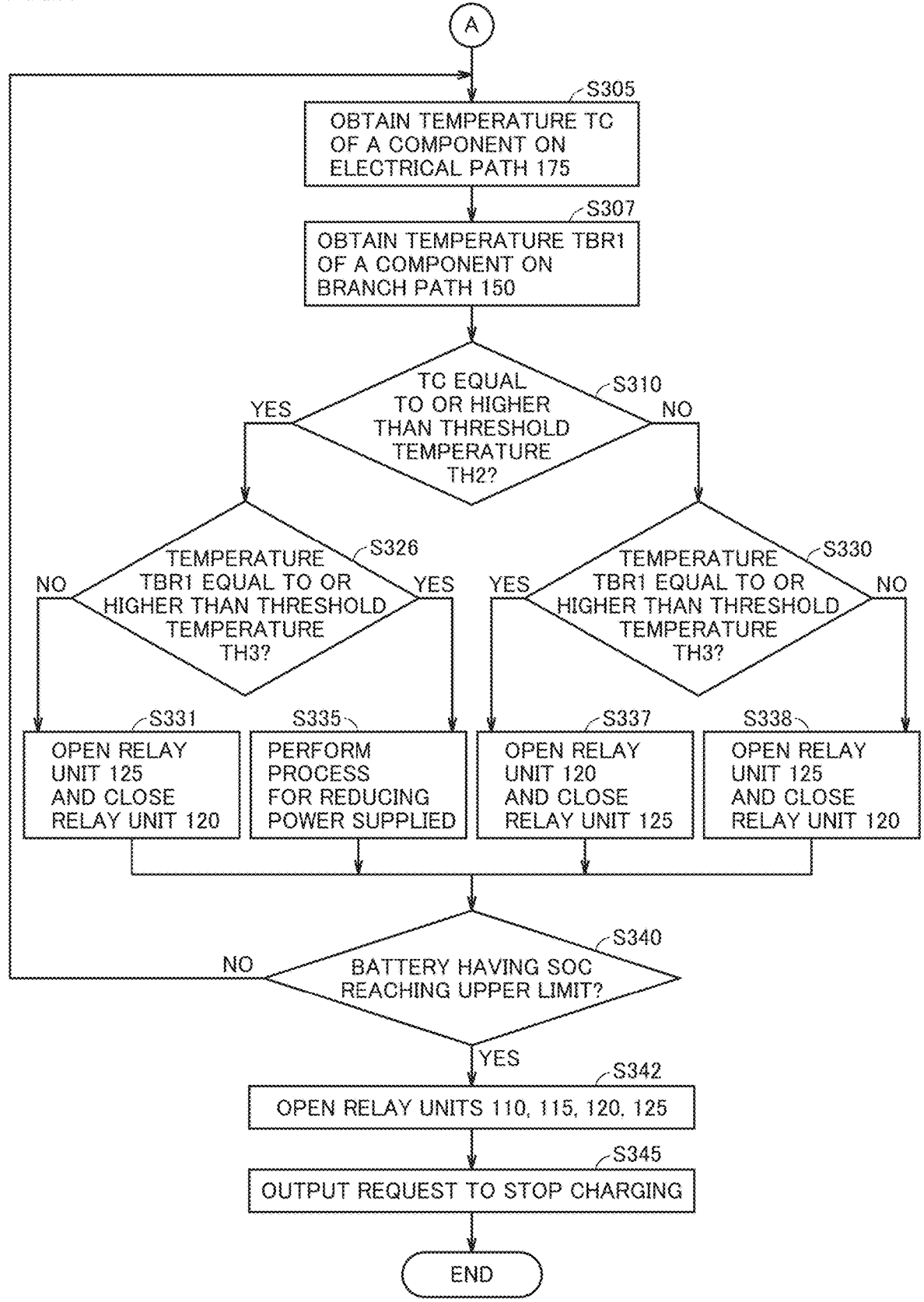
FIG. 7 is a diagram showing an example of a procedure of a process performed by the ECU during the external charging.

FIG. 7 is a diagram showing an example of a procedure of a process performed by ECU 180 during the external charging. The process of this flowchart is performed instead of that of the flowchart of FIG. 5.

In the flowchart of FIG. 7, steps S305, S310, S335, S340, S342, and S345 are the same as steps S205, S210, S235, S240, S242, and S245 of FIG. 5, respectively. The process of the flowchart of FIG. 7 differs from the process of the flowchart of FIG. 5 in that steps S307, S326, S330, S331, S337, and S338 are added.

Referring to FIG. 7, when step S305 is performed, ECU 180 obtains a temperature TBR1 of the component on branch path 150 in accordance with a sensed value of temperature sensor 136 (step S307).

Subsequently, in step S310, ECU 180 branches the process according to whether temperature TC of the component on electrical path 175 is equal to or higher than threshold temperature TH2. When temperature TC is equal to or higher than threshold temperature TH2 (YES in step S310), ECU 180 proceeds to step S326. In contrast, when temperature TC is less than threshold temperature TH2 (NO in step S310), ECU 180 proceeds to step S330.

In step S326, ECU 180 determines whether temperature TBR1 is equal to or higher than a threshold temperature TH3. Threshold temperature TH3 is predetermined as appropriate in order to protect the component on branch path 150 from overheating. When temperature TBR1 is less than threshold temperature TH3 (NO in step S326), ECU 180 controls relay unit 125 to assume the open position and relay unit 120 to assume the closed position (step S331). Thus, as well as when step S215 in FIG. 5 is performed, during the external charging, a portion of the power supplied from power charging station 200 is supplied via branch path 150 to temperature adjustment unit 170 as the power to operate temperature adjustment unit 170. After step S331, ECU 180 proceeds to step S340.

In contrast, when temperature TBR1 is equal to or higher than threshold temperature TH3 (YES in step S326), ECU 180 performs a process for reducing power supplied (step S335). This reduces power in both electrical path 175 and branch path 152. As a result, the component on electrical path 175 and that on branch path 152 can be protected from overheating. After step S335, ECU 180 proceeds to step S340.

In step S330, as well as step S326, ECU 180 branches the process according to whether temperature TBR1 is equal to or higher than threshold temperature TH3. When temperature TBR1 is equal to or higher than threshold temperature TH3 (YES in step S330), ECU 180 controls relay unit 120 to assume the open position and relay unit 125 to assume the closed position (step S337). Thus, a portion of the power supplied from power charging station 200 is supplied via relay units 110 and 125 to temperature adjustment unit 170 as the power to operate temperature adjustment unit 170 without supply of power to branch path 150.

Step S337 is effective when, after step S331, step S340 branches to NO and, as time elapses, temperature TC falls below threshold temperature TH2 (that is, step S310 branches to NO). In this case, branch path 150 no longer receives power, and the power so far supplied to branch path 150 is supplied to electrical path 175 again. And power of substantially the same magnitude as the power so far supplied to branch path 150 is supplied via electrical path 175 and relay unit 125 to temperature adjustment unit 170 as the power to operate temperature adjustment unit 170. As a result, overheating of the component on branch path 150 can be suppressed while the temperature of battery 101 is adjusted.

In contrast, when temperature TBR1 is less than threshold temperature TH3 (NO in step S330), ECU 180 controls relay unit 125 to assume the open position and relay unit 120 to assume the closed position (step S338). Thus, the power to operate temperature adjustment unit 170 is supplied from inlet 102 to temperature adjustment unit 170 via branch path 150. Alternatively, in step S338, unlike the example of FIG. 7, ECU 180 may control relay unit 120 to assume the open position and control relay unit 125 to assume the closed position, as in step S337. Thus, the power to operate temperature adjustment unit 170 is supplied to temperature adjustment unit 170 via inlet 102 and relay units 110 and 125. In step S338, temperature adjustment unit 170 can operate to adjust the temperature of battery 101 regardless of which of these controls ECU 180 performs.

When the process for reducing power supplied is performed in step S335 and thereafter any one of steps S331, 337, and 338 is performed via step S340, ECU 180 outputs a request that power of the normal magnitude be supplied (not shown), as done in step S232 of FIG. 5. In response to the request, controller 206 of power charging station 200 controls charging device 204 so that the power supplied from power charging station 200 has the normal magnitude. As a result, the power supplied from power charging station 200 returns from the power supplied that is reduced (see step S335) to the aforementioned "power of the normal magnitude supplied."

As described above, in the present modified example, when temperature TC of the component on electrical path 175 is equal to or higher than threshold temperature TH2 (YES in step S310) and temperature TBR1 of the component on branch path 150 is higher than threshold temperature TH3 (NO in step S326), ECU 180 controls relay unit 125 to assume the open position and relay unit 120 to assume the closed position (step S331). Further, after step S331 (and S340), when temperature TC of the component on electrical path 175 is lower than threshold temperature TH2 (NO in step S310) and temperature TBR1 of the component on branch path 150 is higher than threshold temperature TH3 (YES in step S330), ECU 180 controls relay unit 120 to assume the open position and relay unit 125 to assume the closed position (step S337).

Thus, a portion of the power supplied from power charging station 200 is supplied via relay units 110 and 125 to temperature adjustment unit 170 as the power to operate temperature adjustment unit 170 without supply of power to branch path 150. As a result, overheating of the component on branch path 150 can be suppressed while the temperature of battery 101 is adjusted.

Modified Example 2

In the above-described embodiment and the first modified example thereof, ECU 180 may adjust temperature adjustment unit 170 in accordance with the temperature of battery 101. For example, ECU 180 may control the heater of temperature adjustment unit 170 such that the lower the temperature of battery 101 is, the larger the amount of heat generated from the heater is. Thus, the temperature of battery 101 can be effectively increased.

Alternatively, ECU 180 may control the cooler of temperature adjustment unit 170 such that the higher the temperature of battery 101 is, the more the cooler is enhanced in performance of cooling the battery. Thus, battery 101 can be effectively cooled.

Controlling temperature adjustment unit 170 as described above can appropriately protect battery 101 in addition to the component on electrical path 175.

Modified Example 3

In the above-described embodiment and the first and second modified examples thereof, ECU 180 obtains the temperature of the component on electrical path 175 in accordance with a sensed value of temperature sensor 130. In contrast, ECU 180 may obtain (estimate) temperature TC of the component on electrical path 175 in accordance with a sensed value of current sensor 135 instead of a sensed value of temperature sensor 130.

Specifically, how much the component is raised in temperature relates to how much heat the component generates, and how much heat the component generates relates to a square value of a value of a current passing through electrical path 175. Accordingly, ECU 180 can determine (or estimate) temperature TC of the component in accordance with the component's initial temperature and specific heat, a sensed value of current sensor 135, and the like. More specifically, whenever a sensed value of current sensor 135 is periodically sampled, ECU 180 calculates how much the component is raised in temperature in accordance with a square value of the sensed value of current sensor 135 (how much heat the component generates) and the specific heat of the component. ECU 180 can determine temperature TC of the component in accordance with an integral value of how much the component is raised in temperature for each period, and the initial temperature of the component. The component's initial temperature and specific heat are appropriately determined through an experiment or the like.

Similarly, ECU 180 may obtain (or estimate) temperature TBR1 of branch path 150 in accordance with a sensed value of current sensor 137 instead of a sensed value of temperature sensor 136.

Thus, when ECU 180 obtains the temperature of the component on electrical path 175 or branch path 150 in accordance with the sensed value of current sensor 135 or 137, temperature sensor 130 or 136 may not be provided.

Other Modified Examples

In the above-described embodiments and the first to third modified examples thereof, as shown in FIG. 3, temperature adjustment mechanism 179 is provided with water passage 177. Temperature adjustment unit 170 indirectly adjusts the temperature of battery 101 via the water in water passage 177. In contrast, the temperature adjustment mechanism 179 may not be provided with water passage 177. That is, temperature adjustment unit 170 may directly adjust the temperature of battery 101 without using the water in water passage 177. Specifically, the heater of temperature adjustment unit 170 may directly heat battery 101, and the cooler of temperature adjustment unit 170 may be an air cooling type cooler.

Relay unit 120 may include only one of relays 120A and 120B. Similarly, relay unit 125 may include only one of relays 125A and 125B. Thus, even when each of relay units 120 and 125 includes only one relay, ECU 180 can switch the open/closed positions of relay units 120 and 125 to switch between conduction and non-conduction through branch paths 150 and 152. Therefore, the number of relays included in relay unit 120 and the number of relays included in relay unit 125 can be reduced from two to one.

In the above description, relay units 110, 120, 125, 115 form an example of a "first relay unit," a "second relay unit," a "third relay unit," and a "fourth relay unit" in the present disclosure, respectively.

Threshold temperatures TH2, TH3, and TH1 form an example of a "first threshold temperature," a "second threshold temperature," and a "third threshold temperature" in the present disclosure, respectively.

It should be understood that the presently disclosed embodiments are illustrative and not restrictive in any respect. The scope of the present invention is defined by the terms of the claims and intended to encompass any modifications within a meaning and scope equivalent to the terms of the claims.

What is claimed is:
1. A vehicle comprising:
a power storage device;

a temperature adjustment device that adjusts the power storage device in temperature;

an inlet that receives power from an external power source external to the vehicle;

a first relay unit provided on a charging path located between the inlet and the power storage device;

a second relay unit provided on a first branch path;

a third relay unit provided on a second branch path, wherein the first branch path is branched from the charging path at a first branch point located between the inlet and the first relay unit, and electrically interconnects the first branch point and the temperature adjustment device, and the second branch path is branched from the charging path at a second branch point located between the first relay unit and the power storage device, and electrically interconnects the second branch point and the temperature adjustment device; and a controller that controls the temperature adjustment device, the first relay unit, the second relay unit, and the third relay unit, wherein the controller performs external charging to charge the power storage device by the external power source by controlling the first relay unit to assume a closed position when the external power source is connected to the inlet, and the controller controls the third relay unit to assume an open position and the second relay unit to assume a closed position when during the external charging the controller drives the temperature adjustment device and a component on the charging path at an electrical path located between the first branch point and the second branch point is higher in temperature than a first threshold temperature.

2. The vehicle according to claim 1, wherein the controller controls the second relay unit to assume an open position and the third relay unit to assume a closed position when the component on the electrical path is lower in temperature than the first threshold temperature and a component on the first branch path is higher in temperature than a second threshold temperature after the controller controls the third relay unit to assume the open position and the second relay unit to assume the closed position.

3. The vehicle according to claim 1, wherein the controller performs a process for reducing power supplied from the external power source to the inlet when the controller drives the temperature adjustment device during the external charging and the inlet is higher in temperature than a third threshold temperature.

4. The vehicle according to claim 1, wherein the controller controls the first relay unit and the second relay unit to assume the open position and the third relay unit to assume the closed position when the controller drives the temperature adjustment device and the inlet is higher in temperature than a third threshold temperature in a period after the external power source is connected to the inlet before the external charging starts.

5. The vehicle according to claim 1, further comprising a fourth relay unit provided on the charging path between the second branch point and the power storage device, wherein when the controller receives an instruction to activate a traveling system of the vehicle, the controller controls the fourth relay unit to assume a closed position, and the controller controls the first relay unit and the second relay unit to assume the open position and the third relay unit to assume the closed position when the controller drives the temperature adjustment device while the controller controls the fourth relay unit to assume the closed position.

6. The vehicle according to claim 1, wherein the temperature adjustment device includes a heating device that heats the power storage device, and the controller controls the heating device such that the heating device generates heat in a larger amount in response to lower temperature of the power storage device.

7. The vehicle according to claim 1, wherein the temperature adjustment device includes a cooling device that cools the power storage device, and the controller controls the cooling device to be enhanced in performance of cooling the power storage device in response to higher temperature of the power storage device.

* * * * *